United States Patent
den Boer et al.

(10) Patent No.: US 10,634,949 B1
(45) Date of Patent: Apr. 28, 2020

(54) DISPLAY SYSTEMS AND METHODS INVOLVING MIM DIODES

(71) Applicant: a.u. Vista Inc., Milpitas, CA (US)

(72) Inventors: Willem den Boer, Milpitas, CA (US); Seok Lyul Lee, Hsinchu (TW)

(73) Assignee: A.U. VISTA INC., Milpitas, CA (US)

( * ) Notice: Subject to any disclaimer, the term of this patent is extended or adjusted under 35 U.S.C. 154(b) by 37 days.

(21) Appl. No.: 16/162,721

(22) Filed: Oct. 17, 2018

(51) Int. Cl.
 *G09G 3/34* (2006.01)
 *G02F 1/1335* (2006.01)
 *G02F 1/13357* (2006.01)
 *G09G 3/36* (2006.01)
 G09G 3/32 (2016.01)

(52) U.S. Cl.
 CPC ..... *G02F 1/133603* (2013.01); *G09G 3/3426* (2013.01); *G09G 3/3614* (2013.01); *G02F 2001/133612* (2013.01); *G09G 3/32* (2013.01); *G09G 3/3688* (2013.01)

(58) Field of Classification Search
 CPC .. G02F 1/133603; G02F 2001/133612; G09G 3/3426; G09G 3/3614; G09G 3/32; G09G 3/3688
 See application file for complete search history.

(56) References Cited

U.S. PATENT DOCUMENTS

| | | | |
|---|---|---|---|
| 6,225,968 B1* | 5/2001 | den Boer | G09G 3/367 345/91 |
| 6,243,062 B1* | 6/2001 | den Boer | G09G 3/367 345/91 |
| 10,527,902 B2* | 1/2020 | Umezaki | G09G 3/3233 |
| 2001/0054711 A1 | 12/2001 | Numao | |
| 2005/0083321 A1* | 4/2005 | Boer | G09G 3/20 345/204 |
| 2007/0132904 A1* | 6/2007 | Hong | G02F 1/1365 349/50 |

* cited by examiner

*Primary Examiner* — Ibrahim A Khan
(74) *Attorney, Agent, or Firm* — McClure, Qualey & Rodack, LLP

(57) ABSTRACT

A representative display system includes: a pixel array having a plurality of pixels, a plurality of select lines, and a plurality of data lines; a first of the plurality of pixels having a first metal-insulator-metal (MIM) diode, a second MIM diode, a first storage capacitor, and a first light emitting diode (LED), the first MIM diode and the second MIM diode being electrically coupled in series between a first of the plurality of select lines and a second of the plurality of select lines, the first storage capacitor and the first LED being electrically coupled, in parallel, between a first of the plurality of data lines and between the first MIM diode and the second MIM diode; wherein the first LED is selectively controllable to emit light in response to corresponding select signals simultaneously provided on the first of the plurality of select lines and the second of the plurality of select lines and in response to data signals on the data lines.

20 Claims, 9 Drawing Sheets

DISPLAY SYSTEMS AND METHODS INVOLVING MIM DIODES

BACKGROUND

Technical Field

The disclosure generally relates to display technology.

Description of the Related Art

Various display technologies (e.g., liquid crystal displays (LCDs)) are widely used in displays for electronic devices, such as laptops, smart phones, digital cameras, billboard-type displays, and high-definition televisions. In addition, other display technologies, such as organic light-emitting diodes (OLEDs) and electronic paper displays (EPDs), are gaining in public attention.

LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a back light. Light from the back light passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the glass substrate, and a liquid crystal compound may be filled into the space between the glass substrate and the color filter forming a layer of liquid crystal material.

Still, the structure of TFTs in displays may be various. For instance, The TFTs, gate and data lines, and pixel electrodes may be formed in a multilayer structure such as that shown in FIGS. 1 and 2E of Lai et al., U.S. Pat. No. 7,170,092 and in its division U.S. Pat. No. 7,507,612, both of which are assigned to AU Optronics Corp., the parent company of the assignee of the current application, and both of which are hereby incorporated by reference in their entireties. The multilayer structure may comprise a first conducting layer, a first insulating layer, a semiconductor layer, a doped semiconductor layer, and a second conducting layer disposed in sequence on the substrate. It may further comprise a second insulating layer and a pixel electrode disposed on the second insulating layer. The first conducting layer may comprise at least one of a gate line or a gate electrode. The doped semiconductor layer may comprise a source and a drain. The second conducting layer may comprise a source electrode and a drain electrode. The multilayer structure may be formed using a series of wet and dry etching processes, for example as disclosed in Lai et al. FIGS. 2A-2D.

Additional techniques for forming TFTs are disclosed in Chen, U.S. Pat. No. 7,652,285, which is assigned to AU Optronics Corp., the parent company of the assignee of the current application, and hereby incorporated by reference in its entirety. As disclosed in Chen, to form the channel of the TFT, the second metal layer is etched in order to open a portion of the second metal layer over the gate electrode and to separate the source region and drain region. This etching can be performed in multiple ways, including the back-channel etching process disclosed for example in Chen FIGS. 2A-2E and the etch stop process disclosed for example in Chen FIGS. 5A-5D and 6. Chen discloses that TFT leakage currents may be reduced by adding a spacer layer formed at the sidewalls of the conductive doped amorphous silicon layer, isolating the conductive amorphous silicon layer from the insulating layer. Chen discloses that this spacer layer can be formed by oxidizing the exposed surface of the conductive amorphous silicon layer after the etch of the second metal layer is performed. Chen discloses that this surface may be oxidized by a number of different techniques, including oxygen plasma ashing, or the use of ozone plasma in the presence of carbon tetrafluoride and sulfur hexafluoride gases As explained in Sawasaki et al., U.S. Pat. No. 7,557,895, which is assigned to AU Optronics Corp., the parent company of the assignee of the current application, and hereby incorporated by reference in its entirety, the thickness of the liquid crystal layer typically must be uniformly controlled, in order to avoid unevenness in brightness across the LCD panel. As disclosed in Sawasaki et al., the required uniformity may be achieved by disposing a plurality of pillar spacers between the TFT substrate and the color filter substrate. As further disclosed in Sawasaki et al., the pillar spacers may be formed with different heights, such that some spacers have a height that is greater than the gap between the substrates and other spacers have a height that is less than the gap between the substrates. This configuration may permit the spacing between the substrates to vary with temperature changes but also prevent excessive deformation when forces are applied to the panel.

Sawasaki et al. further discloses a method for assembling the substrates with the liquid crystal material between them. This method comprises steps of preparing the two substrates, coating a sealing material on the circumference of the outer periphery of one of the pair of substrates, dropping an appropriate volume of liquid crystal on one of the pair of substrates, and filling in the liquid crystal between the pair of substrates by attaching the pair of substrates in a vacuum followed by returning the attached pair of substrates to atmospheric pressure.

In LCD panels, the semiconductor material making up the TFT channel may be amorphous silicon. However, as disclosed in Chen, U.S. Pat. No. 6,818,967, which is assigned to AU Optronics Corp., the parent company of the assignee of the current application, and hereby incorporated by reference in its entirety, poly-silicon channel TFTs offer advantages over amorphous silicon TFTs, including lower power and greater electron migration rates. Poly-silicon may be formed by converting amorphous silicon to poly-silicon via a laser crystallization or laser annealing technique. Use of the laser permits fabrication to occur at temperatures below 600° C., and the fabricating technique is thus called low temperature poly-silicon (LTPS). As disclosed in Chen, the re-crystallization process of LTPS results in the formation of mounds on the surface of the poly-silicon layer, and these mounds impact the current characteristics of the LTPS TFT. Chen discloses a method to reduce the size of the LTPS surface mounds, by performing a first anneal treatment, then performing a surface etching treatment, for example using a solution of hydrofluoric acid, and then performing a second anneal treatment. The resulting LTPS surface has mounds with a height/width ratio of less than 0.2. A gate isolation layer, gate, dielectric layer, and source and drain metal layers can then be deposited above the LTPS layer to form a complete LTPS TFT.

As disclosed in Sun et al., U.S. Pat. No. 8,115,209, which is assigned to AU Optronics Corp., the parent company of the assignee of the current application, and hereby incorporated by reference in its entirety, a disadvantage of LTPS TFTs compared to amorphous silicon TFTs is a relatively large leakage current during TFT turn off. Use of multiple gates reduces leakage current, and Sun et al. discloses a number of different multi-gate structures for a polycrystalline silicon TFT, including those shown in Sun et al. FIGS. 2A-2B and 3-6.

Recently, interest has been directed toward High Dynamic Range LCDs with dynamic contrast ratios of more than 10,000 that can be achieved by using local dimming. One method of local dimming involves a backlight unit (BLU) that uses an array of LEDs that can be individually dimmed depending on the image content. For an implementation of high resolution LCDs of small or medium size, the pitch of the LEDs in the BLU should be less than about 2 mm to prevent halos. This typically requires the use of mini LEDs with a size smaller than 1 mm×1 mm. The number of LEDs in such an array is typically between 1000 and 10,000—for example, an array of 30×30 or 100×100 LEDs.

When the number of LEDs exceeds 1000, driving each LED individually tends to result in too many interconnects and, therefore, matrix addressing is often preferred. Use of passive matrix addressing, although considered a simple option, presents challenges when trying to achieve high enough average LED current, since the LEDs only emit light when they are selected (i.e., about 3% of the time for a typical 30×30 LED array). Because of this, active matrix addressing of mini LED arrays offers promise. Unfortunately, active matrix addressing with the use of TFT backplane arrays may consume excessive amounts of power (e.g., 70%) for driving the TFTs.

Therefore, there is a perceived need for simpler active matrix backplanes that may consume less power.

SUMMARY

Display systems and methods involving MIM diodes are provided. In one embodiment, a display system comprises: a pixel array having a plurality of pixels, a plurality of select lines, and a plurality of data lines; a first of the plurality of pixels having a first metal-insulator-metal (MIM) diode, a second MIM diode, a first storage capacitor, and a first light emitting diode (LED), the first MIM diode and the second MIM diode being electrically coupled in series between a first of the plurality of select lines and a second of the plurality of select lines, the first storage capacitor and the first LED being electrically coupled, in parallel, between a first of the plurality of data lines and between the first MIM diode and the second MIM diode; wherein the first LED is selectively controllable to emit light in response to corresponding select signals simultaneously provided on the first of the plurality of select lines and the second of the plurality of select lines and in response to data signals on the data lines.

In some embodiments, the first of the plurality of select lines is configured to provide first select signals and the second of the plurality of select lines is configured to provide second select signals; and the first select signals and the second select signals exhibit opposing polarities.

In some embodiments, the first of the plurality of pixels further comprises a second LED electrically coupled in parallel with the first storage capacitor and the first LED.

In some embodiments, the first LED is configured to emit light in response to data signals from the first of the plurality of data lines exhibiting a first polarity; and the second LED is configured to emit light in response to the data signals from the first of the plurality of data lines exhibiting a second polarity opposite the first polarity.

In some embodiments, the second LED is electrically coupled, anti-parallel, with the first LED.

In some embodiments, the pixel array is configured as a backlight unit (BLU).

In some embodiments, the display system further comprises a display panel disposed to receive light emitted by the BLU.

In one embodiment, a display apparatus comprises a pixel unit of a pixel array, having: a first select line, formed by a first metal layer; a second select line, formed by the first metal layer, wherein the first select line and the second select line are electrically independent; a data line, formed by a second metal layer; a first metal-insulator-metal (MIM) diode, formed between the first select line and a cover area, wherein the cover area is formed by the second metal layer and disposed on the first metal layer; a second MIM diode, formed between the first select line and the cover area; a capacitor, connected between the data line and the cover area; and a light emitting diode (LED), disposed on the second metal layer, wherein the data line has a contact point and the cover area has a contact point to connect the light emitting diode.

In some embodiments, the LED is a first LED; and the display apparatus further comprises a second LED, disposed on the second metal layer.

In some embodiments, the first LED is configured to emit light in response to data signals from the data line exhibiting a first polarity; and the second LED is configured to emit light in response to the data signals from the data line exhibiting a second polarity opposite the first polarity.

In one embodiment, a method of forming a display system comprises: providing a substrate; disposing an active matrix backplane on the substrate, the active matrix backplane having a plurality of pixels, a plurality of select lines, and a plurality of data lines, a first of the plurality of pixels having a first metal-insulator-metal (MIM) diode and a second MIM diode electrically coupled in series between a first of the plurality of select lines and a second of the plurality of select lines; and disposing a first storage capacitor and a first light emitting diode (LED) on the active matrix backplane, the first storage capacitor and the first LED being electrically coupled, in parallel, between a first of the plurality of data lines and between the first MIM diode and the second MIM diode.

In some embodiments, the method further comprises disposing a second LED on the active matrix backplane, the second LED being electrically coupled in parallel with the first storage capacitor and the first LED.

In some embodiments, each of the first MIM diode and the second MIM diode has a corresponding bottom electrode; and the method further comprises forming the plurality of select lines and the bottom electrode of each of the first MIM diode and the second MIM diode in a first metal layer.

In some embodiments, each of the first MIM diode and the second MIM diode has a corresponding top electrode; and the method further comprises forming the plurality of data lines and the top electrode of each of the first MIM diode and the second MIM diode in a second metal layer.

In some embodiments, the method further comprises disposing a display panel to receive light emitted by the first LED.

In one embodiment, a method of controlling a BLU, the method comprises: providing a plurality of pixels, a plurality of select lines, and a plurality of data lines, wherein a first of the plurality of pixels has a first metal-insulator-metal (MIM) diode, a second MIM diode, a first storage capacitor, and a first light emitting diode (LED), the first MIM diode and the second MIM diode being electrically coupled in series between a first of the plurality of select lines and a second of the plurality of select lines, the first storage capacitor and the first LED being electrically coupled, in parallel, between a first of the plurality of data lines and between the first MIM diode and the second MIM diode; and providing simultaneous select signals on the first of the plurality of select lines and the second of the plurality of select lines to selectively control the first LED to emit light in combination with the signal on the data line.

In some embodiments, the first of the plurality of select lines is configured to provide first select signals and the second of the plurality of select lines is configured to provide second select signals; and the first select signals and the second select signals exhibit opposing polarities.

In some embodiments, in providing the plurality of pixels, the first of the plurality of pixels further comprises a second LED electrically coupled in parallel with the first storage capacitor and the first LED; the first LED is configured to emit light in response to data signals from the first of the plurality of data lines exhibiting a first polarity; and the second LED is configured to emit light in response to the data signals from the first of the plurality of data lines exhibiting a second polarity opposite the first polarity.

In some embodiments, in providing the simultaneous select signals, the first LED is selectively controlled to emit light during multiple sequential ones of the simultaneous select signals, and then the second LED is selectively controlled to emit light during subsequent multiple sequential ones of the simultaneous select signals.

In some embodiments, in providing the simultaneous select signals, the first LED and the second LED are selectively controlled to emit light from the first of the plurality of pixels without the first storage capacitor completely discharging.

Other objects, features, and/or advantages will become apparent from the following detailed description of the preferred but non-limiting embodiments. The following description is made with reference to the accompanying drawings.

DETAILED DESCRIPTION

For ease in explanation, the following discussion describes several embodiments of systems and methods involving MIM diodes. It is to be understood that the invention is not limited in its application to the details of the particular arrangements shown since the invention is capable of other embodiments. Also, the terminology used herein is for the purpose of description and not of limitation.

In this regard, as will be described in greater detail below, various systems and methods may provide alternatives to active matrix backplanes that implement LTPS technology. In some embodiments, this may be accomplished with lower production cost than those associated with producing LTPS backplanes, while the active matrix backplanes themselves exhibit lower power consumption. Preferred embodiments will now be described with reference to the drawings.

Figure 1:
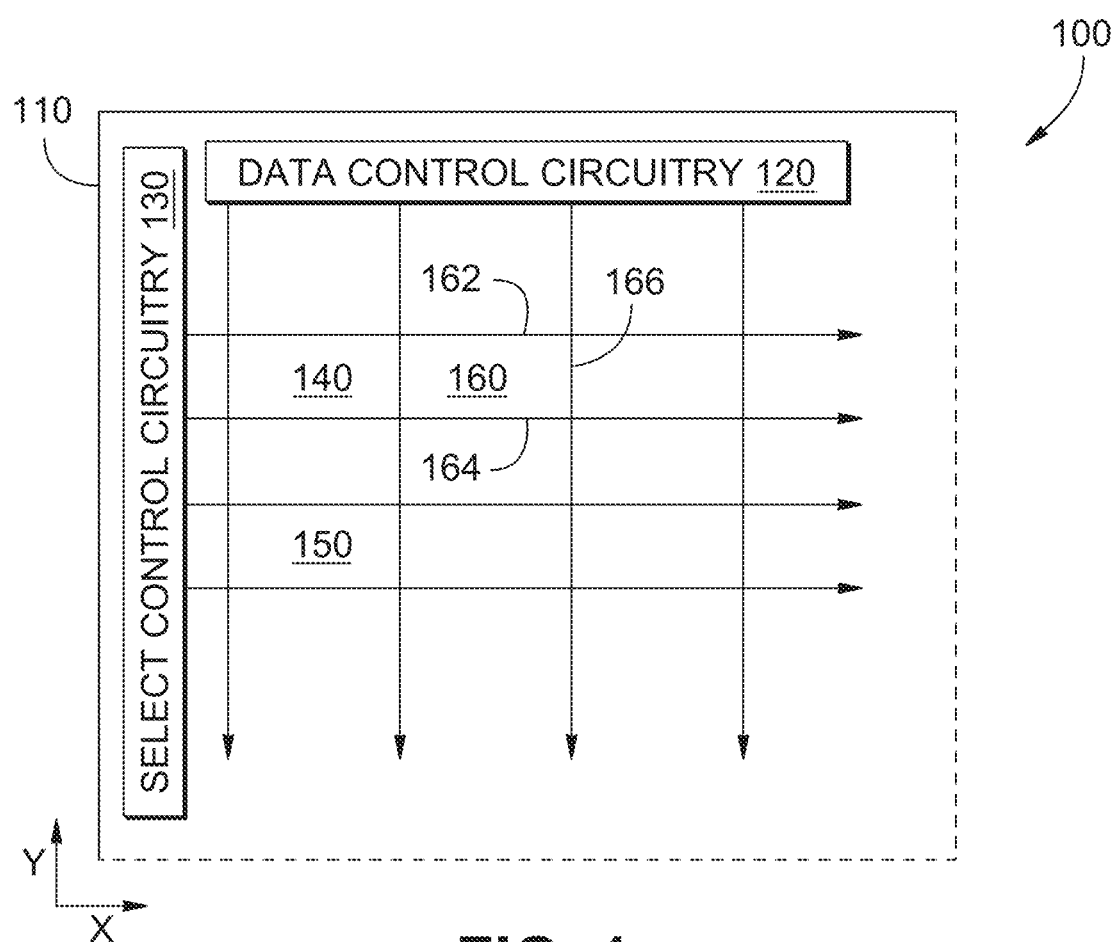
FIG. 1 is a schematic diagram of a portion of an embodiment of a display system.

With reference to FIG. 1, a portion of an embodiment of a display system 100 is depicted. Display system 100 includes a pixel array that may be used in various implementations, such as a direct mini-LED or micro-LED display panel (for example, for digital signage and watches) or as a backlight unit (BLU) that is configured to provide light for use by a display panel (not shown in FIG. 1). For the description that follows, the pixel array of FIG. 1 will be referred to as BLU 110, which incorporates data driver circuitry 120 and select driver circuitry 130. It should be noted that circuits and functions of various embodiments may be implemented by hardware, software or a combination of hardware and software such as microcontrollers, application-specific integrated circuits (ASIC) and programmable microcontrollers.

In keeping with the description of FIG. 1, BLU 110 incorporates a plurality of pixels (typically thousands of pixels, e.g., pixels 140, 150), which are arranged in a two-dimensional array comprising a plurality of rows and columns. For ease in illustration, only a few pixels are illustrated in FIG. 1. The components of each pixel (described later) in a given row are connected between adjacent ones of the select lines (e.g., lines 152 and 154) and to a data line (e.g., line 156). By way of example, pixel 160 is connected between select lines 162 and 164 and to a data line 166. Data driver circuitry 120 and select driver circuitry 130 control the voltage applied to the respective select and data lines to individually address each pixel for controlling emission of light from one or more LEDs associated with the pixel.

Figure 2:
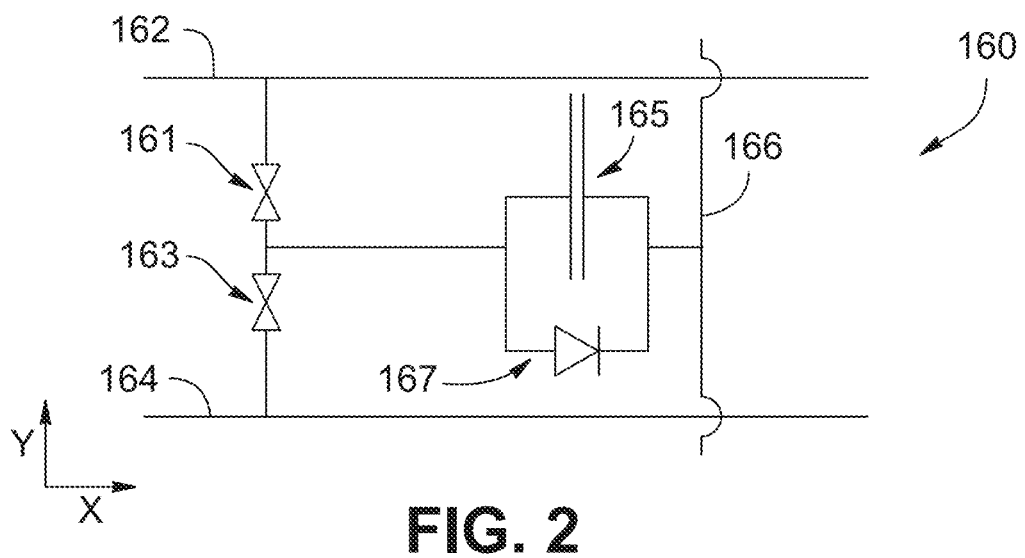
FIG. 2 is a schematic diagram of an embodiment of a BLU pixel.

FIG. 2 shows pixel 160 in greater detail. In particular, pixel 160 incorporates first and second MIM diodes 161, 163, a storage capacitor 165, and an LED 167 (e.g., a mini LED). MIM diodes 161 and 163 are electrically coupled in series between select line 162 and select line 164. Storage capacitor 165 and LED 167 are electrically coupled in parallel between data line 166 and between MIM diodes 161 and 163.

In operation, LED 167 is selectively controllable to emit light in response to corresponding select signals (i.e., Vs1+Vs2) simultaneously provided on select lines 162 and 164. Specifically, select lines 162 and 164 may simultaneously receive opposite polarity select pulses of approximately 20 to 25V and approximately −15 to −20V, respectively. The voltage between the two MIM diodes settles at (Vs1+Vs2)/2 at the end of the select pulse. If Vd is the data voltage, the storage capacitor is charged to (Vs1+Vs2)/2−Vd. For example, if Vs1=20 V, Vs2=−17 V and Vd=−3 V, then the storage capacitor is charged to 6 V. Notably, if the data voltage is low enough, LED 167 begins to emit light. After the select pulses are turned off, the data voltage stored on storage capacitor 165 is discharged through LED 167, thereby continuing emission of light after the select pulses are turned off.

Average LED current may be controlled by varying the data voltage. In particular, the average LED current is proportional to the data voltage and also to (Vs1+Vs2)/2. Thus, light emitted by LED 167 can be dimmed by reducing the absolute value of the data voltage.

Figure 3:
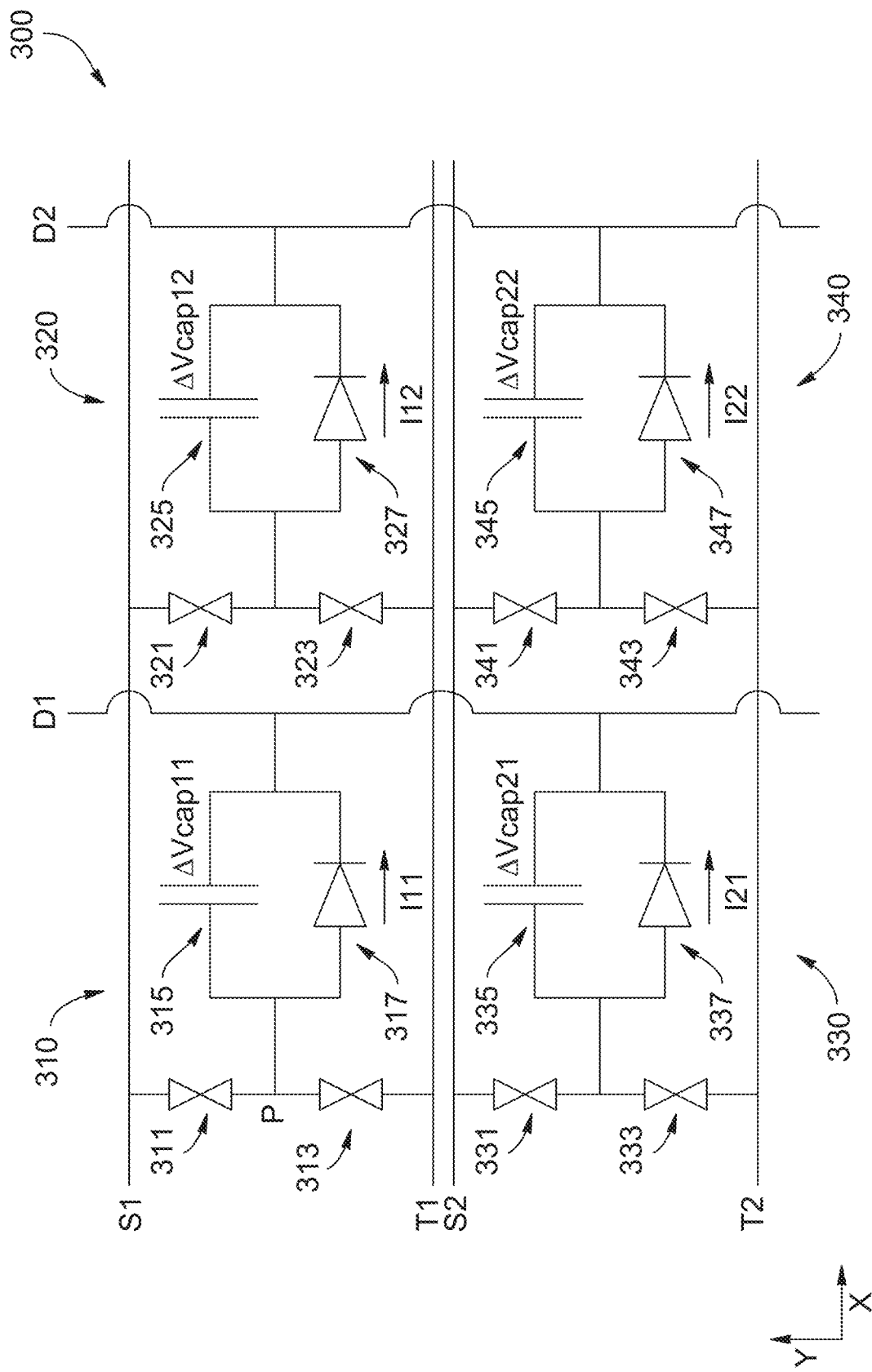
FIG. 3 is a schematic diagram of a portion of another embodiment of a display system showing an array of BLU pixels.

FIG. 3 is a schematic diagram of a portion of an embodiment of a BLU 300 showing four adjacent BLU pixels (i.e., pixels 310, 320, 330, and 340). Pixel 310 incorporates MIM diodes 311, 313, a storage capacitor 315, and an LED 317, with MIM diodes 311 and 313 being electrically coupled in series between select line S1 and select line T1. Storage capacitor 315 and LED 317 are electrically coupled, in parallel, between data line D1 and between MIM diodes 311 and 313 (i.e., at point P). In some embodiments, storage capacitor 315 may be of about 100 nF to act as a short-term "battery". Additionally, peak current of LED 317 may exceed 1 mA in some embodiments.

Pixel 320 incorporates MIM diodes 321, 323, a storage capacitor 325, and an LED 327, with MIM diodes 321 and 323 being electrically coupled in series between select line S1 and select line T1. Storage capacitor 325 and LED 327 are electrically coupled, in parallel, between data line D2 and between MIM diodes 321 and 323. Pixel 330 incorporates MIM diodes 331, 333, a storage capacitor 335, and an LED 337, with MIM diodes 331 and 333 being electrically coupled in series between select line S2 and select line T2. Storage capacitor 335 and LED 337 are electrically coupled, in parallel, between data line D1 and between MIM diodes 331 and 333. Pixel 340 incorporates MIM diodes 341, 343, a storage capacitor 345, and an LED 347, with MIM diodes 341 and 343 being electrically coupled in series between select line S2 and select line T2. Storage capacitor 345 and LED 347 are electrically coupled, in parallel, between data line D2 and between MIM diodes 341 and 343.

Figure 4:
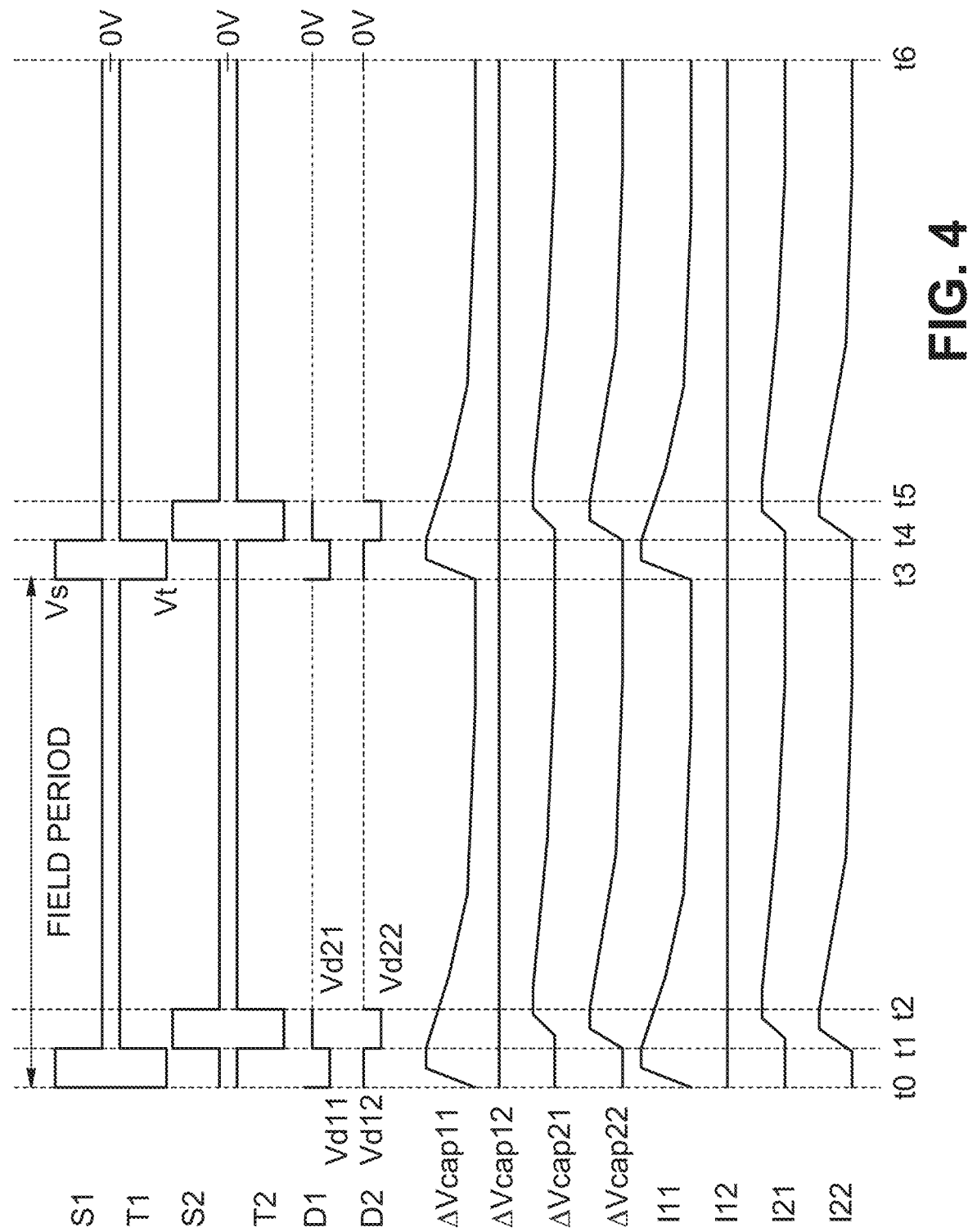
FIG. 4 is a timing diagram showing operation of an embodiment of an array of BLU pixels.

FIG. 4 is a timing diagram showing the embodiment of FIG. 3 in operation. As shown in FIG. 4, simultaneous positive and negative select pulses of voltages Vs and Vt, respectively, are provided on S1 and T1, respectively, from time t0 to t1. By way of example, in some embodiments, Vs may equal +19V and Vt may equal −17V. As a result, corresponding points P between the MIM diodes of each of pixels 310, 320, 330, and 340 settle at (Vs+Vt)/2 at the end of the select time (i.e., at t1). Additionally, voltage across capacitor Δvcap for each of the capacitors 315, 325, 335, and 345 settles at (Vs+Vt)/2−Vd during the interval of t0 to t1. Depending on the data voltage Vd associated with each of the pixels (which may be in the range of 0 to −5V in some embodiments), the corresponding LED may emit light during and after the select time as the corresponding capacitor discharges, which may occur between time t1 and t3. It should be noted that the field period (e.g., the period between t0 and t3) may range from 1 msec to 8 msec in some embodiments. In some embodiments, voltages on the S and T select lines may be ramped during non-select times to extend the duration of LED emission.

Figure 5:
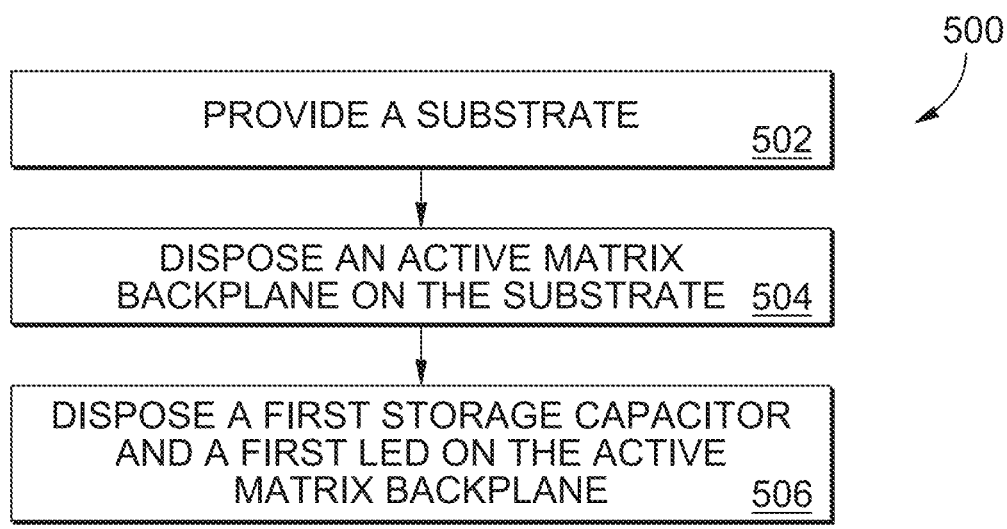
FIG. 5 is a flowchart depicting an embodiment of a method of forming an array of BLU pixels.

FIG. 5 is a flowchart depicting an embodiment of a method of forming a display system. As shown in FIG. 5, method 500 may be construed as beginning at block 502, in which a substrate is provided. In block 504, an active matrix backplane is disposed on the substrate. In some embodiments, the active matrix backplane incorporates a plurality of pixels, a plurality of select lines, and a plurality of data lines, with a first of the plurality of pixels including a first MIM diode and a second MIM diode electrically coupled in series between a first of the plurality of select lines and a second of the plurality of select lines. In block 506, a first storage capacitor and a first LED are disposed on the active matrix backplane. In some embodiments, the first storage capacitor and the first LED are electrically coupled, in parallel, between a first of the plurality of data lines and between the first MIM diode and the second MIM diode.

Figure 6:
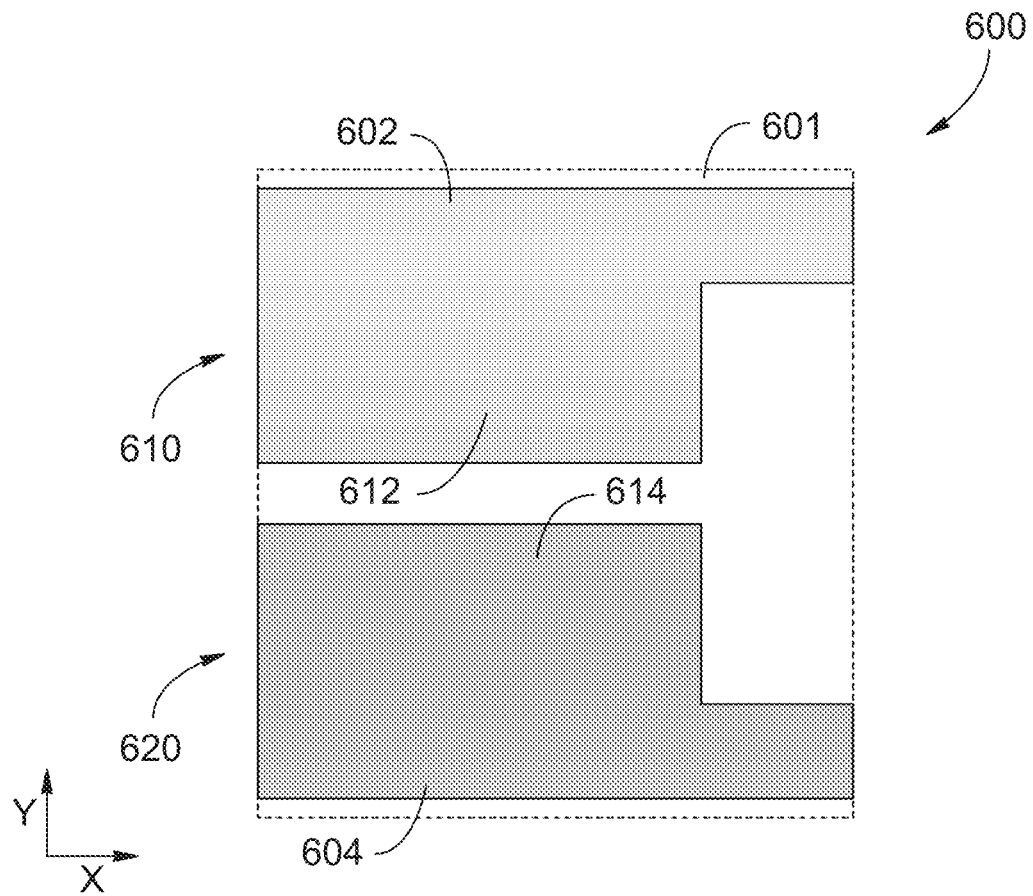
FIGS. 6-8 are schematic diagrams, in plan view, showing representative steps associated with an embodiment of a method of forming an array of BLU pixels.
Figure 7:
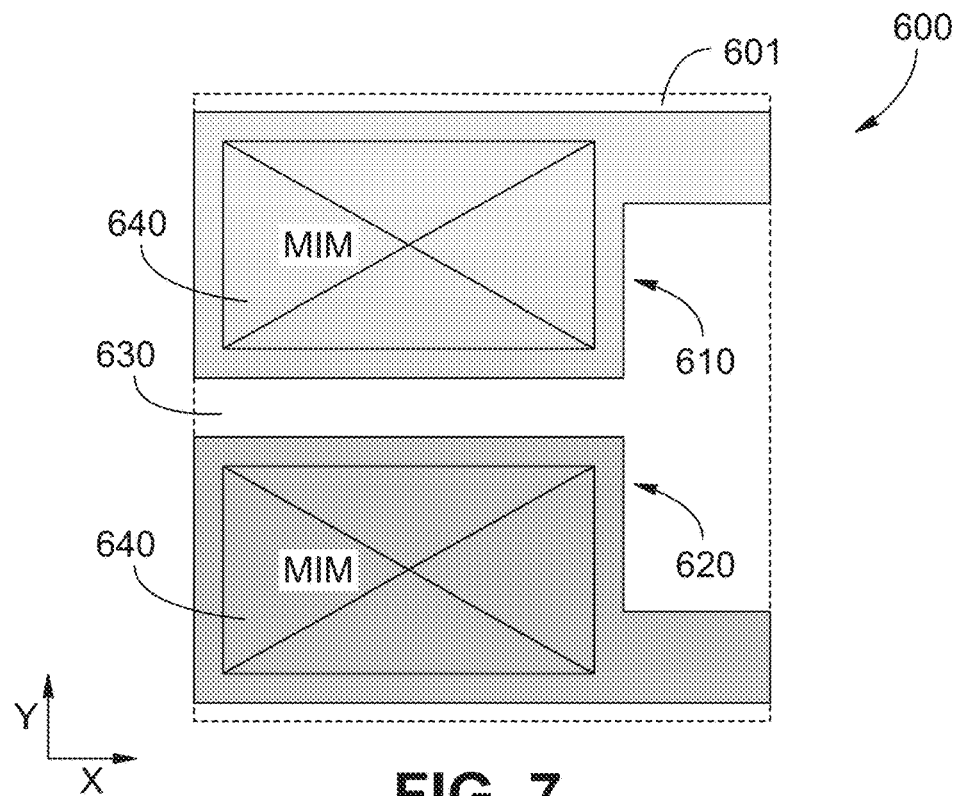
Figure 8:
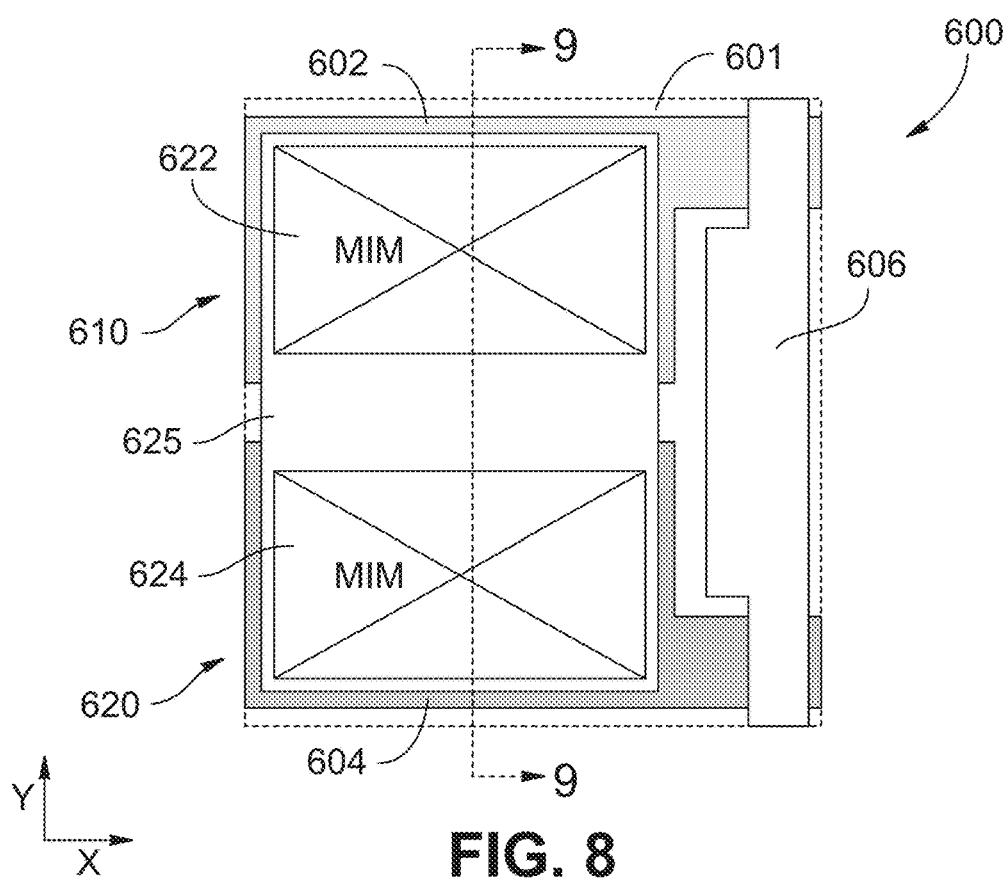

FIGS. 6-8 are schematic diagrams, in plan view, showing representative steps associated with an embodiment of a method of forming a display system. In particular, FIGS. 6-8 depict manufacturing of a BLU pixel unit 600. As shown in FIG. 6, a substrate 601 is provided upon which an active matrix backplane is disposed. In particular, deposition and patterning (PEP1) of Metal 1 is performed to form select lines 602, 604, as well as bottom electrodes 612, 614 for MIM diodes 610 and 620, respectively.

As shown in FIG. 7, deposition and patterning of interlevel dielectric (PEP2) is performed. In some embodiments, interlevel dielectric 630 may be Si3N4, for example. Thereafter, deposition of insulator material 640 (for example, Si-rich SiNx) for forming MIM diodes 610, 620 is performed. In some embodiments, no patterning is required for deposition of insulator material 640. Notably, if Si-rich SiNx, deposited by Plasma CVD, is used for insulator material 640, the threshold voltages of the MIM diodes can be varied by changing the ratio of gases and/or adjusting the power during Plasma CVD. The gas mixture during Plasma CVD of SiNx is, for example, SiH4, NH3 and H2. By increasing the ratio of SiH4 and NH3 in the plasma, the MIM threshold voltage may be reduced and the MIM current may be increased. If NH3 gas flow is very low or absent in the plasma, the MIM diode becomes a Schottky diode and the choice of metals for the bottom and top electrode can be used to control the ON current in combination with the thickness of the i-layer.

As shown in FIG. 8, deposition and patterning of Metal 2 (PEP3) is performed to form data line 606, as well as top electrodes 622, 624 for MIM diodes 610 and 620, respectively. In some embodiments, Metal 2 used for forming top electrodes 622 and 624 are deposited in a contiguous contact area (e.g., contact area 625, which spans both MIM diodes 610 and 620). Thus, only four deposition steps and three patterning steps may be needed, which is a perceived improvement over an LTPS TFT process.

Figure 9:
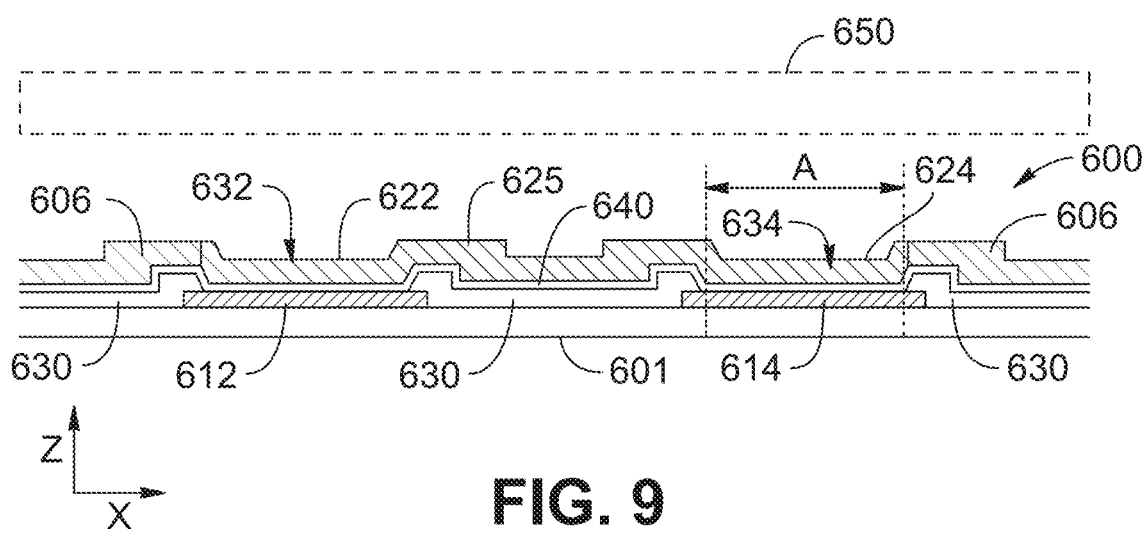
FIG. 9 is a schematic diagram depicting a cross-section of the embodiment of FIG. 8 as viewed along section line 9-9.

FIG. 9 is a schematic diagram depicting a cross-section of the embodiment of FIG. 8 as viewed along section line 9-9. As shown in FIG. 8, the area of each of the MIM diodes (one of which is annotated by double-headed arrow A) is determined by a corresponding via opening 632, 634 in the interlevel dielectric 630. This potentially eliminates yield loss from step coverage issues of the SiNx over the edges of the bottom electrodes and also photo leakage currents, since both bottom electrodes 612, 614 and top electrodes 622, 624 extend beyond the edges of the MIM diode area. Also shown in FIG. 9 is a display panel 650 (e.g., a liquid crystal display panel) that is disposed to receive light emitted by the BLU.

Figure 10:
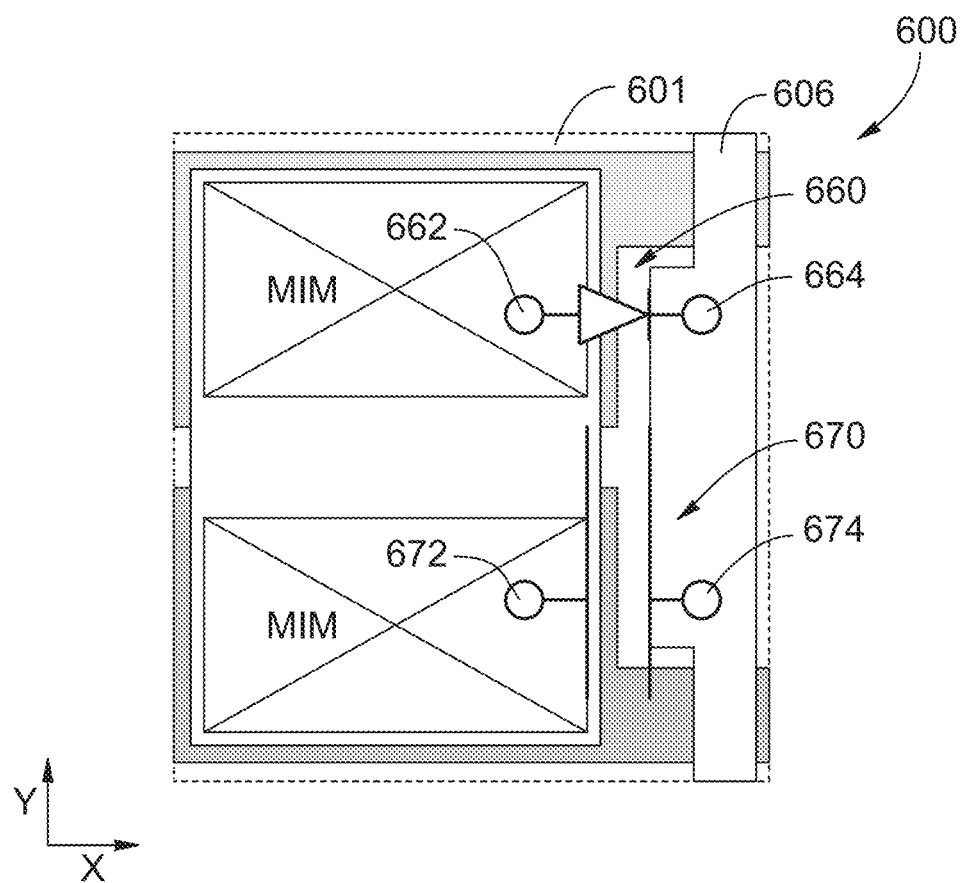
FIG. 10 is a schematic diagram, in plan view, of the BLU pixel associated with FIGS. 6-10.

FIG. 10 is a schematic diagram depicting a BLU pixel unit 600, in plan view, after mini LED 660 and storage capacitor 670 are mounted to the active matrix backplane. In particular, mini LED 660 is mounted using contact points 662 and 664, and storage capacitor 670 is mounted using contact points 672 and 674. By way of example, mini LEDs and capacitors can be added to the active matrix backplane by surface mount technology or by mass transfer. In some embodiments, a storage capacitor (e.g., storage capacitor 670) may be before or at the same time as the mini LEDs. In some embodiments, if surface mount technology is used, the capacitors may be, for example, 100 nF surface mount capacitors made by Murata, with an area each of about 0.4×0.2 mm.

Figure 11:
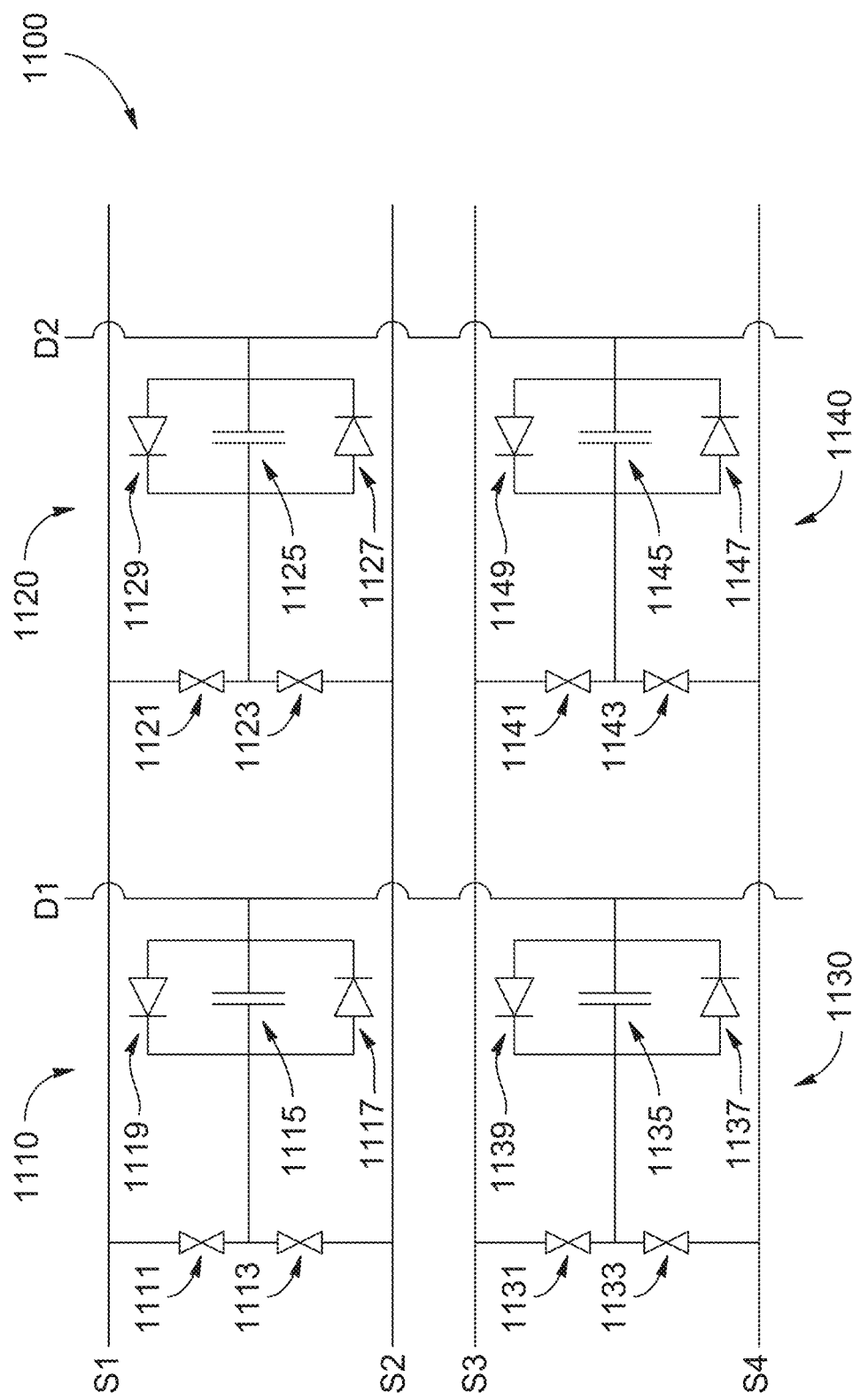
FIG. 11 is a schematic diagram of a portion of another embodiment of a display system showing an array of BLU pixels.

FIG. 11 is a schematic diagram of a portion of another embodiment showing four adjacent BLU pixels (i.e., pixels 1110, 1120, 1130, and 1140) of a BLU 1100. Specifically, dual select drives with two MIMs per pixel are used, which tend to cancel out non-uniformity and temperature dependence of the MIM current-voltage characteristics. Perceived advantage of the configuration of FIG. 11 with two LEDs per pixel include a 50% reduction in surface mount storage capacitors, as well as a 50% reduction of MIM diodes and select lines. However, a perceived disadvantage includes 2× larger MIM diodes to compensate for the fact that first and second LEDs can not simultaneously emit light, but have to be operated sequentially. This is the result of the anti-parallel configuration of the first and second LED. That is, only one of them is forward-biased and emits light at any time.

As shown in FIG. 11, pixel 1110 incorporates MIM diodes 1111 and 1113, a storage capacitor 1115, and first and second LEDs 1117 and 1119. MIM diodes 1111 and 1113 are electrically coupled in series between select line S1 and select line S2. Storage capacitor 1115 and LEDs 1117 and 1119 are electrically coupled, in parallel, between data line D1 and between MIM diodes 1111 and 1113. Notably, LED 1117 is configured to emit light in response to data signals on D1 exhibiting a first polarity, and LED 1119 is configured to emit light in response to the data signals on D1 exhibiting a second polarity opposite the first polarity. Pixel 1120 incorporates MIM diodes 1121 and 1123, a storage capacitor 1125, and LEDs 1127 and 1129. MIM diodes 1121 and 1123 are electrically coupled in series between select line S1 and select line S2. Storage capacitor 1125 and LEDs 1127 and 1129 are electrically coupled, anti-parallel, between data line D2 and between MIM diodes 1121 and 1123.

Pixel 1130 incorporates MIM diodes 1131 and 1133, a storage capacitor 1135, and LEDs 1137 and 1139. MIM diodes 1131 and 1133 are electrically coupled in series between select line S3 and select line S4. Storage capacitor 1135 and LEDs 1137 and 1139 are electrically coupled, in parallel, between data line D1 and between MIM diodes 1131 and 1133. Pixel 1140 incorporates MIM diodes 1141 and 1143, a storage capacitor 1145, and LEDs 1147 and 1149. MIM diodes 1141 and 1143 are electrically coupled in series between select line S3 and select line S4. Storage capacitor 1145 and LEDs 1147 and 1149 are electrically coupled, in parallel, between data line D2 and between MIM diodes 1141 and 1143.

The two LEDs of each pixel are sequentially operated to emit light. By way of example, for pixel 1110, LED 1117 is operated when data voltage on D1 is positive and LED 1119 is operated when data voltage on D1 is negative. An example drive scheme when using two LEDs per pixel may involve using a frame rate (e.g., a 1000 Hz frame rate). At the selected frame rate, a first LED (e.g., LED 1117) is operated 5 times in 5 msec, followed by a second LED (e.g., LED 1119) being operated 5 times in 5 msec. This results in a total cycle of 10 msec and potentially avoids flicker. Notably, operating each LED 5 times in a row before operating the other LED 5 times may avoid full discharge and charge of the storage capacitor to the opposite voltage for each msec, thereby reducing power consumption.

Figure 12:
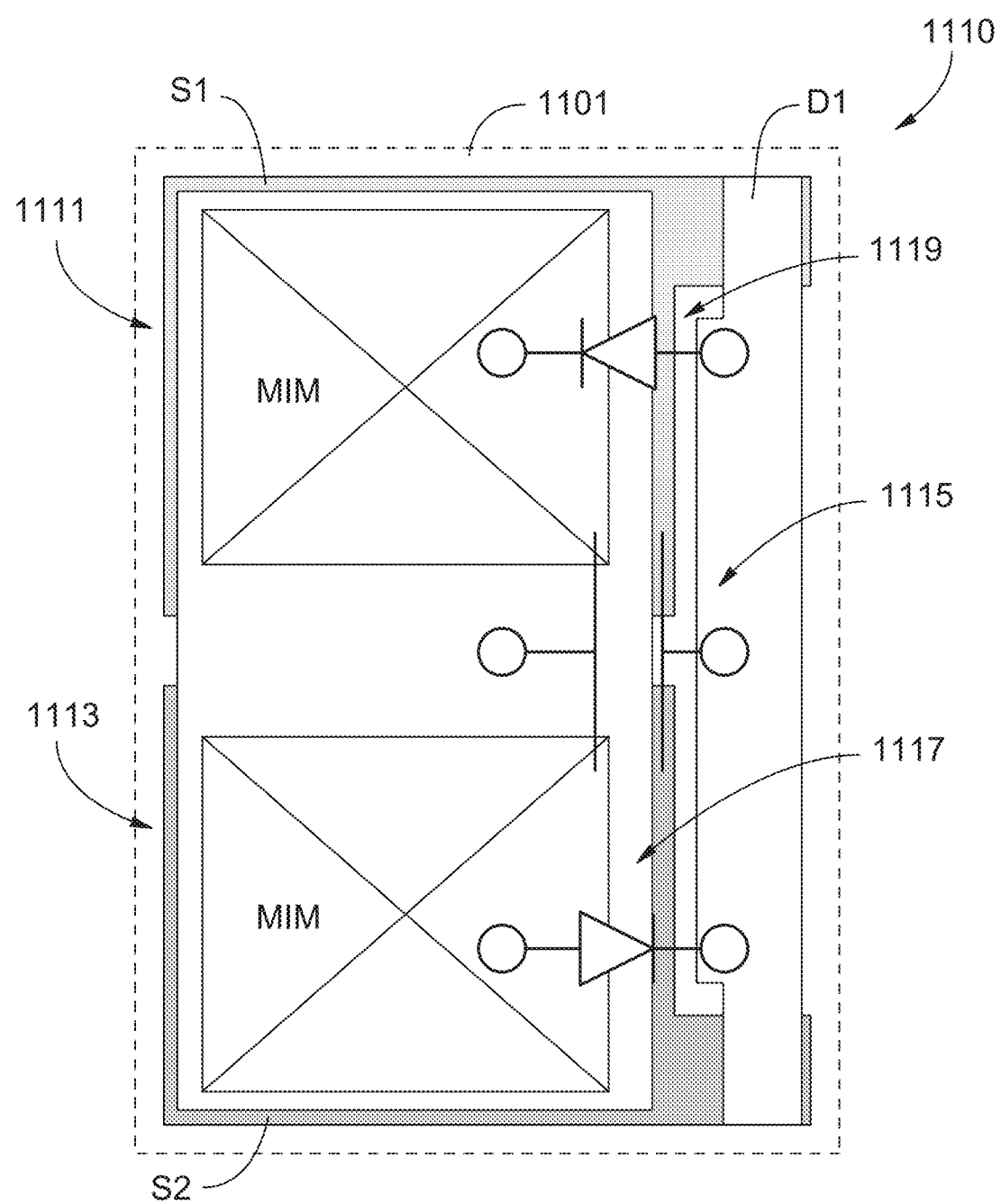
FIG. 12 is a schematic diagram, in plan view, of another embodiment of a BLU pixel.

FIG. 12 is a schematic diagram, in plan view, of pixel 1110 of FIG. 11. As shown in FIG. 12, MIM diodes 1111 and 1113, select lines S1 and S2, and data line D1 are disposed on substrate 1101. Storage capacitor 1115 and LEDs 1117 and 1119 are mounted (e.g., through contact points) to be electrically coupled, anti-parallel, between data line D1 and between MIM diodes 1111 and 1113.

Figure 13:
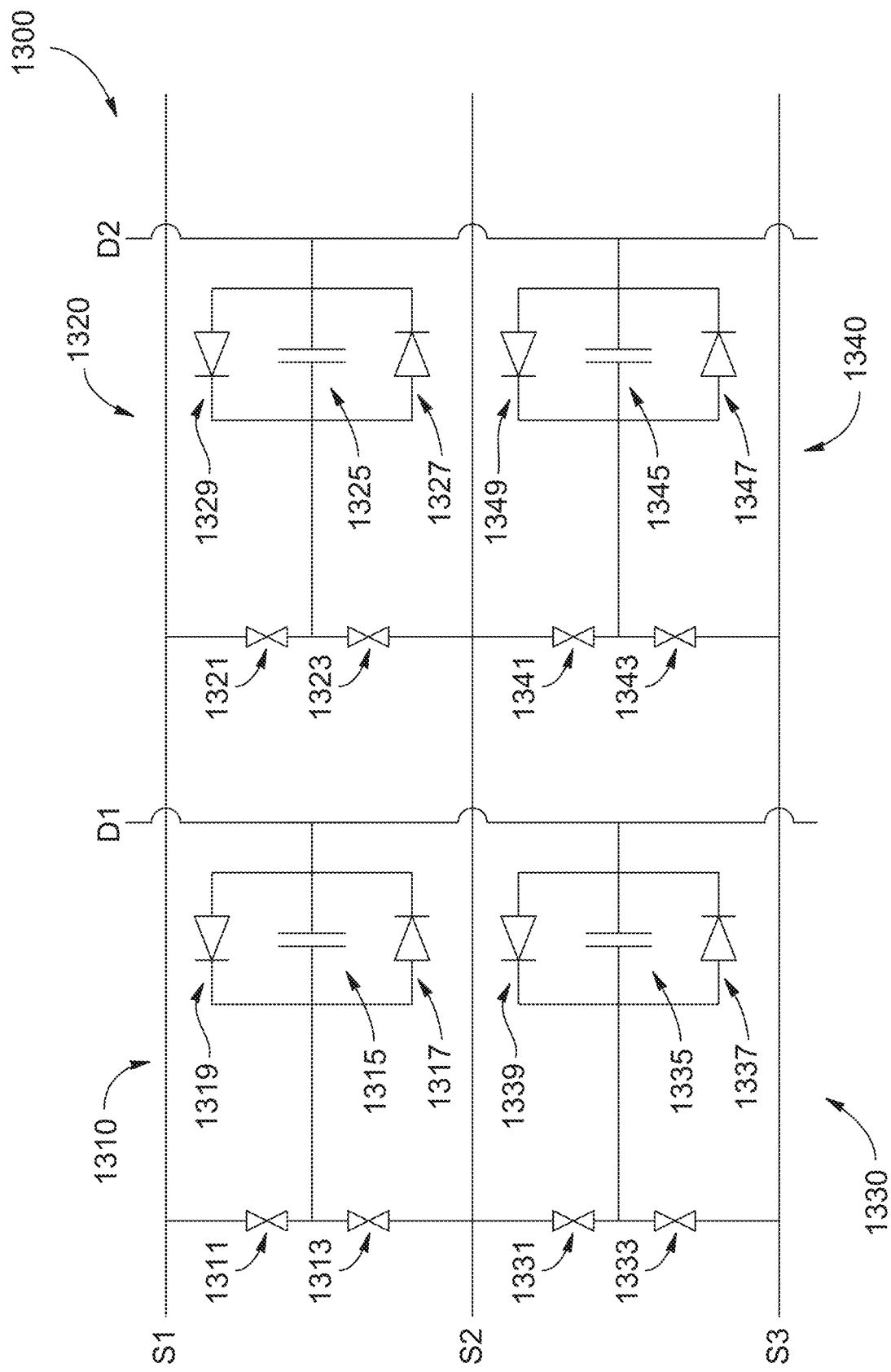
FIG. 13 is a schematic diagram of a portion of another embodiment of a display system showing an array of BLU pixels.

FIG. 13 is a schematic diagram of a portion of another embodiment of a display system showing an array of BLU pixels. In particular, in this embodiment, two LEDs per pixel are used as in the embodiment of FIGS. 11 and 12; however, select lines also are shared to provide further potential cost reduction. A perceived advantage for such a configuration involves a further reduction by 50% of select lines and interconnections for the select lines.

In FIG. 13, four adjacent BLU pixels (i.e., pixels 1310, 1320, 1330, and 1340) of a BLU 1300 are depicted. Pixel 1310 incorporates MIM diodes 1311 and 1313, a storage capacitor 1315, and first and second LEDs 1317 and 1319. MIM diodes 1311 and 1313 are electrically coupled in series between select line S1 and select line S2. Storage capacitor 1315 and LEDs 1317 and 1319 are electrically coupled, anti-parallel, between data line D1 and between MIM diodes 1311 and 1313. Pixel 1320 incorporates MIM diodes 1321 and 1323, a storage capacitor 1325, and LEDs 1327 and 1329. MIM diodes 1321 and 1323 are electrically coupled in series between select line S1 and select line S2. Storage capacitor 1325 and LEDs 1327 and 1329 are electrically coupled, in parallel, between data line D2 and between MIM diodes 1321 and 1323.

Pixel 1330 incorporates MIM diodes 1331 and 1333, a storage capacitor 1335, and LEDs 1337 and 1339. MIM diodes 1331 and 1333 are electrically coupled in series between select line S2 and select line S3. Storage capacitor 1335 and LEDs 1337 and 1339 are electrically coupled, in parallel, between data line D1 and between MIM diodes 1331 and 1333. Pixel 1340 incorporates MIM diodes 1341 and 1343, a storage capacitor 1345, and LEDs 1347 and 1349. MIM diodes 1341 and 1343 are electrically coupled in series between select line S2 and select line S3. Storage capacitor 1345 and LEDs 1347 and 1349 are electrically coupled, in parallel, between data line D2 and between MIM diodes 1341 and 1343. Thus, select line S2 is shared between adjacent rows of the BLU pixels—a first row, which includes pixels 1310 and 1320, and a second row, which includes pixels 1330 and 1340.

An example manner of operating a configuration such as shown in FIG. 13 is described in detail in U.S. Published Application 2005/0083321, which is incorporated herein by reference in its entirety.

The embodiments described above are illustrative of the invention and it will be appreciated that various permutations of these embodiments may be implemented consistent with the scope and spirit of the invention.

What is claimed is:
1. A display system comprising:
a pixel array having a plurality of pixels, a plurality of select lines, and a plurality of data lines;
a first of the plurality of pixels having a first metal-insulator-metal (MIM) diode, a second MIM diode, a first storage capacitor, and a first light emitting diode (LED), the first MIM diode and the second MIM diode being electrically coupled in series between a first of the plurality of select lines and a second of the plurality of select lines, the first storage capacitor and the first LED being electrically coupled, in parallel, between a first of the plurality of data lines and between the first MIM diode and the second MIM diode;

wherein the first LED is selectively controllable to emit light in response to corresponding select signals simultaneously provided on the first of the plurality of select lines and the second of the plurality of select lines and in response to data signals on the data lines.

2. The display system of claim 1, wherein:
the first of the plurality of select lines is configured to provide first select signals and the second of the plurality of select lines is configured to provide second select signals; and
the first select signals and the second select signals exhibit opposing polarities.

3. The display system of claim 1, wherein the first of the plurality of pixels further comprises a second LED electrically coupled in parallel with the first storage capacitor and the first LED.

4. The display system of claim 3, wherein:
the first LED is configured to emit light in response to data signals from the first of the plurality of data lines exhibiting a first polarity; and
the second LED is configured to emit light in response to the data signals from the first of the plurality of data lines exhibiting a second polarity opposite the first polarity.

5. The display system of claim 1, wherein the second LED is electrically coupled, anti-parallel, with the first LED.

6. The display system of claim 1, wherein the pixel array is configured as a backlight unit (BLU).

7. The display system of claim 6, further comprising a display panel disposed to receive light emitted by the BLU.

8. A display apparatus comprising:
a pixel unit of a pixel array, having:
a first select line, formed by a first metal layer;
a second select line, formed by the first metal layer, wherein the first select line and the second select line are electrically independent;
a data line, formed by a second metal layer;
a first metal-insulator-metal (MIM) diode, formed between the first select line and a cover area, wherein the cover area is formed by the second metal layer and disposed on the first metal layer;
a second MIM diode, formed between the first select line and the cover area;
a capacitor, connected between the data line and the cover area; and
a light emitting diode (LED), disposed on the second metal layer, wherein the data line has a contact point and the cover area has a contact point to connect the light emitting diode.

9. The display apparatus of claim 8, wherein:
the LED is a first LED; and
the display apparatus further comprises a second LED, disposed on the second metal layer.

10. The display apparatus of claim 9, wherein:
the first LED is configured to emit light in response to data signals from the data line exhibiting a first polarity; and
the second LED is configured to emit light in response to the data signals from the data line exhibiting a second polarity opposite the first polarity.

11. A method of forming a display system comprising:
providing a substrate;
disposing an active matrix backplane on the substrate, the active matrix backplane having a plurality of pixels, a plurality of select lines, and a plurality of data lines, a first of the plurality of pixels having a first metal-insulator-metal (MIM) diode and a second MIM diode electrically coupled in series between a first of the plurality of select lines and a second of the plurality of select lines; and
disposing a first storage capacitor and a first light emitting diode (LED) on the active matrix backplane, the first storage capacitor and the first LED being electrically coupled, in parallel, between a first of the plurality of data lines and between the first MIM diode and the second MIM diode.

12. The method of claim 11, further comprising disposing a second LED on the active matrix backplane, the second LED being electrically coupled in parallel with the first storage capacitor and the first LED.

13. The method of claim 11, wherein:
each of the first MIM diode and the second MIM diode has a corresponding bottom electrode; and
the method further comprises forming the plurality of select lines and the bottom electrode of each of the first MIM diode and the second MIM diode in a first metal layer.

14. The method of claim 13, wherein:
each of the first MIM diode and the second MIM diode has a corresponding top electrode; and
the method further comprises forming the plurality of data lines and the top electrode of each of the first MIM diode and the second MIM diode in a second metal layer.

15. The method of claim 11, further comprising disposing a display panel to receive light emitted by the first LED.

16. A method of controlling a backlight unit (BLU), the method comprising:
providing a plurality of pixels, a plurality of select lines, and a plurality of data lines, wherein a first of the plurality of pixels has a first metal-insulator-metal (MIM) diode, a second MIM diode, a first storage capacitor, and a first light emitting diode (LED), the first MIM diode and the second MIM diode being electrically coupled in series between a first of the plurality of select lines and a second of the plurality of select lines, the first storage capacitor and the first LED being electrically coupled, in parallel, between a first of the plurality of data lines and between the first MIM diode and the second IM diode; and
providing simultaneous select signals on the first of the plurality of select lines and the second of the plurality of select lines to selectively control the first LED to emit light in combination with the signal on the data line.

17. The method of claim 16, wherein:
the first of the plurality of select lines is configured to provide first select signals and the second of the plurality of select lines is configured to provide second select signals; and
the first select signals and the second select signals exhibit opposing polarities.

18. The method of claim 16, wherein:
in providing the plurality of pixels, the first of the plurality of pixels further comprises a second LED electrically coupled in parallel with the first storage capacitor and the first LED;
the first LED is configured to emit light in response to data signals from the first of the plurality of data lines exhibiting a first polarity; and the second LED is configured to emit light in response to the data signals from the first of the plurality of data lines exhibiting a second polarity opposite the first polarity.

19. The method of claim 18, wherein, in providing the simultaneous select signals, the first LED is selectively controlled to emit light during multiple sequential ones of the simultaneous select signals, and then the second LED is selectively controlled to emit light during subsequent multiple sequential ones of the simultaneous select signals.

20. The method of claim 18, wherein, in providing the simultaneous select signals, the first LED and the second LED are selectively controlled to emit light from the first of the plurality of pixels without the first storage capacitor completely discharging.

* * * * *